(12) United States Patent (10) Patent No.: US 9,381,429 B2
Raitt et al. (45) Date of Patent: *Jul. 5, 2016

(54) COMPOSITING MULTIPLE SCENE SHOTS INTO A VIDEO GAME CLIP

(75) Inventors: Bay Leaf Raitt, Carnation, WA (US); Joseph Eddy Demers, Seattle, WA (US); Yahn William Bernier, Seattle, WA (US); Brian Ratcliff Jacobson, Seattle, WA (US); Marc Sean Scaparro, Bellevue, WA (US); Karl Ian Whinnie, Issaquah, WA (US)

(73) Assignee: VALVE CORPORATION, Bellevue, WA (US)

( * ) Notice: Subject to any disclaimer, the term of this patent is extended or adjusted under 35 U.S.C. 154(b) by 152 days.

This patent is subject to a terminal disclaimer.

(21) Appl. No.: 13/034,629

(22) Filed: Feb. 24, 2011

(65) Prior Publication Data

US 2012/0028706 A1 Feb. 2, 2012

Related U.S. Application Data

(60) Provisional application No. 61/308,070, filed on Feb. 25, 2010, provisional application No. 61/307,778, filed on Feb. 24, 2010.

(51) Int. Cl.
*A63F 13/10* (2006.01)
*A63F 13/12* (2006.01)
(Continued)

(52) U.S. Cl.
CPC .............. *A63F 13/10* (2013.01); *A63F 13/12* (2013.01); *A63F 13/63* (2014.09); *A63F 13/86* (2014.09);
(Continued)

(58) Field of Classification Search
CPC .............. G06T 15/00–15/87; G06T 13/00; G06T 13/20; G06T 13/40; G06T 13/60; G06T 2210/56; G06T 2210/61; G06T 7/20; G06T 19/00; G06T 2213/00; G06T 2213/04; G06T 2213/08; G06T 2213/12; G06T 2213/64; A63F 13/10; A63F 13/12; A63F 2300/5593; A63F 2300/6018; A63F 2300/634; A63F 2300/6607; A63F 2300/6009; A63F 2300/66; A63F 2300/577
USPC .................................................. 345/473–475
See application file for complete search history.

(56) References Cited

U.S. PATENT DOCUMENTS 8,368,700 B1 * 2/2013 DiFrancesco et al. ........ 345/473
2003/0137516 A1 * 7/2003 Harvill et al. ................. 345/473
(Continued)

OTHER PUBLICATIONS

Excerpt from "Carrara 7", Dec. 11, 2008, DAZ3d.*
(Continued)

*Primary Examiner* — Werner Garner
(74) *Attorney, Agent, or Firm* — Stephen J. Lieb; Frommer Lawrence & Haug LLP

(57) ABSTRACT

Embodiments are directed to compositing multi-dimensional video game world data obtained from execution of a video game world sequence. An animation editor records the video game world data within a plurality of data logs after execution of an animation component of the video game world and prior to providing the data to a material system and/or graphics device for rendering. The user may edit the recorded data to make modifications in the recorded game sequence, by compositing sequences with content such as other sequences, multiple composited recordings, and/or a modified camera perspective during the editing process. The composited modifications may then be fed back for re-recording the animation component.

24 Claims, 7 Drawing Sheets

(51) Int. Cl.
*G06T 13/00* (2011.01)
*G06T 13/20* (2011.01)
*G06T 13/40* (2011.01)
*A63F 13/40* (2014.01)
*A63F 13/30* (2014.01)
*A63F 13/63* (2014.01)
*A63F 13/86* (2014.01)

(52) U.S. Cl.
CPC . *A63F 2300/5593* (2013.01); *A63F 2300/6018* (2013.01); *A63F 2300/634* (2013.01); *A63F 2300/6607* (2013.01); *A63F 2300/6646* (2013.01); *G06T 13/00* (2013.01); *G06T 13/20* (2013.01); *G06T 13/40* (2013.01)

(56) References Cited

U.S. PATENT DOCUMENTS

2007/0162854 A1* 7/2007 Kikinis .......................... 715/719
2008/0268961 A1* 10/2008 Brook et al. ..................... 463/42
2010/0214313 A1* 8/2010 Herman ................. A63F 13/10
                                                                345/593

OTHER PUBLICATIONS

"The Machinima FAQ", Aug. 3, 2005, Academy of Machinima Arts & Sciences.*
Chapter 14 from "Falcon 4.0", 1998, Microprose.*
Excerpt from "Carrara 7", Dec. 11, 2008, DAZ3D, pp. 651-719.*

* cited by examiner

COMPOSITING MULTIPLE SCENE SHOTS INTO A VIDEO GAME CLIP

CROSS-REFERENCE TO RELATED APPLICATIONS

This application is a utility patent application based on U.S. Provisional Patent Application, Ser. No. 61/307,778, filed on Feb. 24, 2010, the benefit of which is hereby claimed under 35 U.S.C. §119(e), and is related to U.S. Provisional Patent Application, Ser. No. 61/308,070, filed Feb. 25, 2010. Both Provisional Patent applications in their entirety are incorporated by reference herein.

FIELD OF THE INVENTION

The present disclosure relates to virtual environment systems, and in particular, but not exclusively, to a system and method for acquiring and editing multi-dimensional video game world data that is useable to composite multiple video game sequences into a resultant composite video game for display.

BACKGROUND

Motion capture is a mechanism often used in the movie recording industry for recording movement and translating the movement onto a digital model. In particular, in the movie industry, motion capture involves recording of actions of human actors and using that recorded information to animate a digital character model in 3-dimensional (3D) animation.

In a typical motion capture session, an actor may wear recording devices, sometimes called markers, at various locations on their body. A computing device may then record motion from changes in a position or angle between the markers. Acoustic, inertial, LED, magnetic and/or reflective markers may be used to obtain the changes. This recorded data may then be mapped to a 3D animation model so that the model may then perform the same actions as that of the actor. Often, camera movements can also be motion captured so that a virtual camera in the scene may pan, tilt, or perform other actions, to enable the animation model to have a same perspective as the video images from the camera.

While motion capture does provide rapid or even real time results, motion capture also has several disadvantages. For example, motion capture often requires reshooting of a scene when problems occur. Moreover, because live actors are used, movements that might not follow the laws of physics generally cannot be motion captured. Moreover, where the computer model has different proportions to that of the actor, the captured data might result in unacceptable artifacts due to recording intersections of data, or the like. Therefore, it is with respect to these considerations and others that the present invention has been made.

BRIEF DESCRIPTION OF THE DRAWINGS

Non-limiting and non-exhaustive embodiments of the present invention are described in reference to the following drawings. In the drawings, like reference numerals refer to like parts through all the various figures unless otherwise explicit.

For a better understanding of the present disclosure, a reference will be made to the following detailed description, which is to be read in association with the accompanying drawings, wherein.

DETAILED DESCRIPTION

Figure 1:
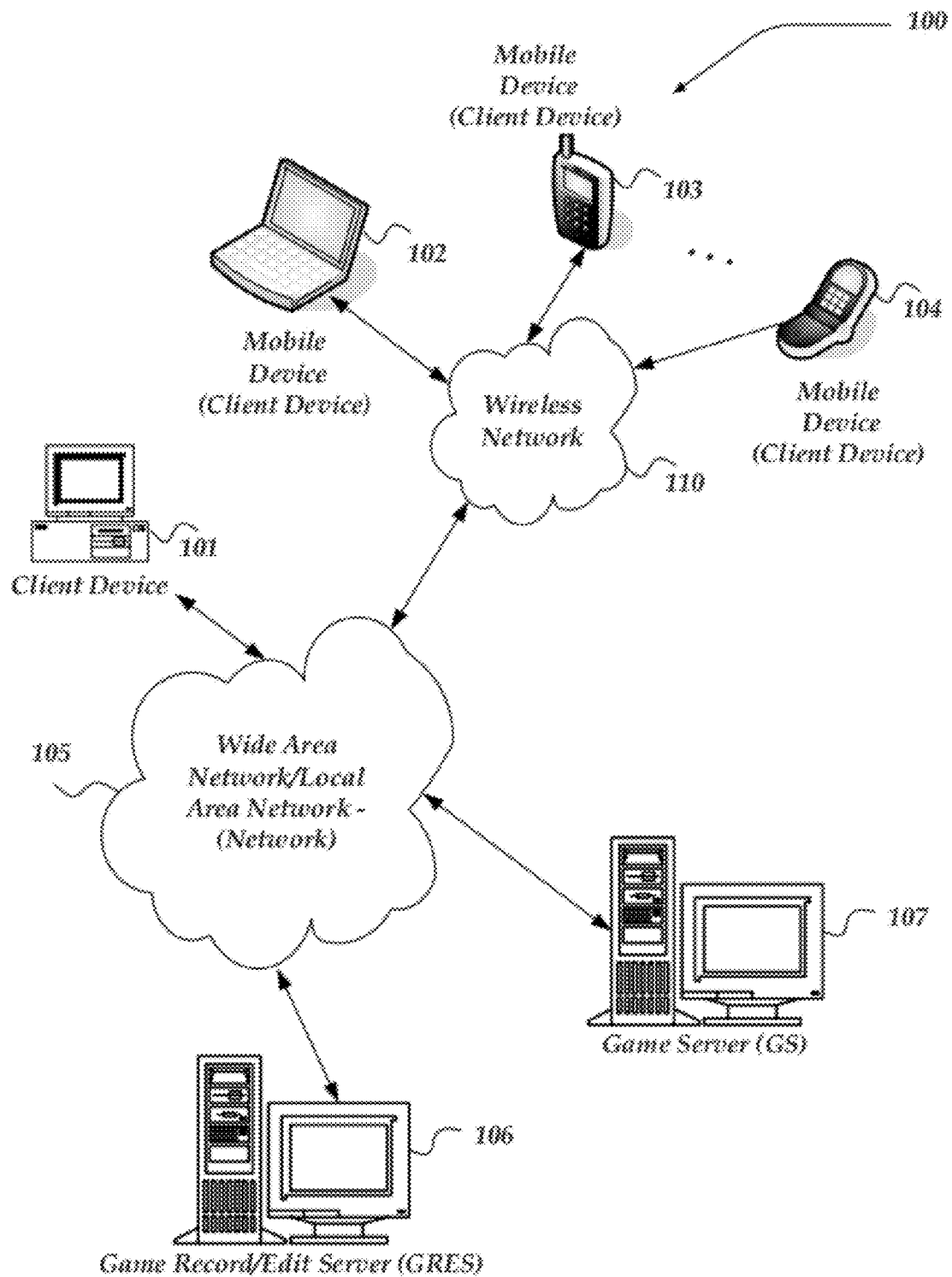
FIG. 1 is a block diagram of one embodiment of a system in which the present invention may be employed.

The present disclosure will now be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

As used herein, the term "motion capture" refers to a process of recording movement of a live actor, and translating that movement into a digital model. A used herein, the term "animation motion capture" refers to a process of recording movement and other components of a video game world for later use in re-computing a game state for playing and/or editing. Thus, animation motion capture is directed at overcoming at least some of the disadvantages of live motion capture involving a live actor, including, for example, being constrained by the laws of physics, an inability to modify a viewer's perspective of the video game world during a 'playback,' as well as other constraints that are discussed further below.

As used herein, the term "character" refers to an object or a portion of an object that has multiple visual representations in an animation or animation frame. Examples of characters include a person, animal, hair of a character, an object such as a weapon held by a person, clothes various anthropomorphized objects, or the like. A character has a visual representation on a computer display device. However, a character may have other representations, such as numeric, geometric, or a mathematical representation.

As used herein, the term "game," or "video game" refers to an interactive sequence of images played back in time with audio to create a non-linear activity for the player. As used herein, the term "movie" refers to a fixed sequence of images played back in time with audio to create a linear narrative experience.

As used herein, the term "sequence" refers to a subset of a movie, that includes shots. Further, a sequence may be associated with a particular level.

As used herein, the term "level" refers to a virtual world as experience by a player of the game, usually including, for example, puzzles or objectives. A level may be composed of 3D representations of a sky, ground, ocean, buildings, plants, characters, sounds, or the like.

As used herein, the term "shot" refers to a subset of a sequence. Each shot includes a minimum of a time duration and a camera to view a game world. A shot further includes all the components in a scene, including, for example, characters, motions, and the like, as described further below. As used herein, the term "clip" refers to a shot.

As used herein, the term "time selection" refers to a duration of time. In one embodiment, the user may select a range of time within a shot over which to apply a modification of recorded animation. In one embodiment, a user can make an irregular motion, smooth by selecting the time selection and applying a smoothing operation. A time selection may also have fade in and fade out regions before and after the specified time selection to help create smooth transitions to/from the effected time region. This is referred to herein as time selection falloff.

As used herein, the term "animation" refers to a sequence of data that describes change over time of one or more images. The animation may be stored in a set of data formats within a plurality of distinct data logs such as Booleans (for components of the animation such as visibility, events, particles, or the like); integers (for components of the animation such as texture assignments or the like); floats (for components of the animation, such as light brightness or the like); vectors (for components of the animation, such as colors of the like); or quaternions (for transforms, or the like). Each data has a corresponding time that is then used to create a corresponding visual representation by evaluating the data at that time stamp and connecting various display components, such as those described further below.

As used herein, the terms "log" or "data log" refer to a collection of time value pairs used to store animation data. As described further below, the animation data is stored in a plurality of distinct data logs, such that a data log may correspond to a given frame within the animation.

As used herein, the term "frame" refers to a single visual representation of an image within a sequence of images. Thus, in one embodiment, an animation is represented by a sequence of frames.

As an example, then, a movie includes sequences. The sequence includes shots, which in turn includes frames. A frame then may be made by combining the game world data and, if available, any recorded data, which in turn is fed into a material system and associated hardware for display to a user.

Briefly stated, the present disclosure is directed towards providing an integrated video game and editing system for recording multi-dimensional video game world data that may be subsequently edited and fed back into a video game for modifying a display of a video game sequence. The multi-dimensional video game world data is recorded at a sufficiently early stage (or upstream of lower level rendering and output primitives) during execution of a video game such that a plurality of multi-dimensional video game world data components are recorded and made available for later editing. In one embodiment, the recording of the game world data is obtained from output of an animation system component of the video game, as described in more detail below in conjunction with FIG. 3.

In one embodiment, the multi-dimensional video game world data may be used to generate a composite of multiple scenes in a persistent virtual world/environment, such as an animation sequence in a video game. Generally, a sequence of frames may be selected for compositing that depicts a sequence of events or actions that have some relationship between them or share a common theme. For example, a chase sequence in a movie showing a segment of the movie involving a chase might be selected for compositing. Each sequence contributes a subset of the content useable for combining multiple sequences into a composite sequence. In one embodiment, a composite sequence may be created by traversing multiple cycles of a compositing process. Each cycle includes executing a video animation sequence, such as a video game, capturing the sequence as multi-dimensional video game world data, editing or replaying the captured animation sequence to add more content to over the animation sequence (e.g., creating a new sequence), and integrating (or compositing) the edited sequence back into a new animation sequence. Thus, the composite result is progressively built up one layer at a time by compositing multiple sequences, each sequence may be generated from a different cycle. In another illustrative embodiment, the sequences may be created during cycles performed in parallel. The resulting sequence may then be composited together to create the composite resulting new sequence. The composite sequence can thus be considered a union of the individual sequences.

It should be noted, however, that compositing may be performed over a sequence or any sub-set thereof. Thus, in one embodiment, the compositing may be performed over a single shot, or even a single frame, without departing from the scope of the invention.

In one embodiment, the recorded multi-dimensional video game world data represents a plurality of components of the game world such as motion data, state data, logical and/or physical physics data including collision data, events, character data, or the like. The recorded multi-dimensional video game world data however, might not be directly useable to render an animated image for display. Instead, the recorded multi-dimensional video game world data is arranged to be fed into a material system that is configured to perform such pre-rendering activities such as occlusion analysis, lighting, shading, and other actions upon the output from the video game. The output of the material system may then be rendered for display of a video game image or images (e.g., sequence). In one embodiment, the rendering may be performed using a graphics hardware card or other component of a computing device. By collecting the data used to compute the images rather than the images themselves, or the rendered data of the image, or even inputs to the video game, an editor (e.g., user) is afforded greater flexibility in manipulating or otherwise editing a video game play sequence. Based upon this, the data used to compute the images may be modified using the herein disclosed game recorder/editor (GRE).

In traditional filmmaking, video sequences are based on a sequence of two-dimensional images, such as video clips. When a filmmaker wants to change the image(s) within a video clip, often a regeneration of the video clip is required. That is, a live action filmmaker might have to re-assemble staff, equipment, actors, or the like, to recapture the image(s). For animated movies, the animators would have to start over again, as well, by replaying, modifying, rendering, and then re-recording the video sequence of images. In traditional animated movies, and/or live action filmmaking, the process of re-doing a video sequence can be expensive.

Unlike traditional approaches, the disclosed integrated video game and editing system fundamentally shifts the foundation of filmmaking away from two-dimensional video clips, and instead records data for a plurality of multi-dimensional video game world components that may then be fed back into the video game for use in computing data useable for a downstream rendering component to render the video sequence for display on a computer display device. Using the multi-dimensional video game world data, an editor may readily add characters, change animations, move camera perspectives, and the like, for a video sequence, without having to completely recreate the video sequence. Such approaches would not be feasible, for example, where the recorded sequence represents a streamed video sequence of images, or even data used by a rendering component to render the video sequence. Moreover, by recording the data used to compute the images rather than the images themselves, the GRE enables a user to modify a larger variety of details of a video game sequence. Additionally, in one embodiment, such modifications may be fed back into the video game to result in new computations of a video game sequence, thereby taking advantage of the animation system. By feeding the results back into the video game, compositing may be performed by adding to the new video game sequence, additional content within the replayed video game.

Although the disclosures discussed herein are focused on animations and more particularly on video games, those skilled in the art will appreciate that the systems, devices, and methods described may be output to create other media content, such as comic books, posters, movies, marketing materials, or combination of film and animation, or other applications to generate toys, without departing from the spirit of the disclosure. Moreover, the input may be from virtually any multi-dimensional input, such as simulation systems, architectural visualizations, or the like. Furthermore, the functionality of the invention may also be employed with a non-video game world system, that could include motion capture data and manual animation of characters, objects, events, and the like, for other types of applications e.g., movies, television, webcasts, and the like.

Illustrative Operating Environment

FIG. 1 illustrates a block diagram generally showing an overview of one embodiment of a system in which the present invention may be practiced. System 100 may include many more components than those shown in FIG. 1. However, the components shown are sufficient to disclose an illustrative embodiment for practicing the present invention. As shown in the figure, system 100 includes local area networks ("LANs")/wide area networks ("WANs")-(network) 105, wireless network 110, client devices 101-104, Game Record/Edit Server (GRES) 106, and game server (GS) 107.

Client devices 102-104 may include virtually any mobile computing device capable of receiving and sending a message over a network, such as network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information. For example, in one embodiment, the browser may be employed to access and/or play a video game accessible over one or more networks from GS 107 and/or GRES 106.

Client devices 101-104 also may include at least one other client application that is configured to receive content from another computing device. The client application may include a capability to provide and receive textual content, multimedia information, components to a computer application, such as a video game, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to enable a user to request and/or otherwise obtain various computer applications, including, but not limited to video game applications, such as a video game client component, or the like. In one embodiment, the computer application may be obtained via a portable storage device such as a CD-ROM, a digital versatile disk (DVD), optical storage device, magnetic cassette, magnetic tape, magnetic disk storage, or the like. However, in another embodiment, client devices 101-104 may be enabled to request and/or otherwise obtain various computer applications over a network, from such as GRES 106 and/or GS 107, or the like.

Thus, for example, a user of client devices 101-104 might request and receive a computer game application, such as an online computer game, or the like. In one embodiment, the user may have the computer game execute a client management component on one of client devices 101-104 that may then be employed to communicate over network 105 (and/or wireless network 110) with GS 107, GRES 106, and/or other client devices, to enable the gaming experience.

In another embodiment, client devices 101-104 may also be configured to play a video game that is hosted remotely at one or more of GRES 106 and/or GS 107. In one embodiment, client devices 101-104 may further access a game recorder and/or game editor application that may be remotely hosted on GRES 106. Thus, a user of client devices 101-104 may configure a video game for play, and record one or more sequences of video game play using the game recorder. In one embodiment, the game recorder is configured to record multi-dimensional video game world data including, but not limited to a plurality of joints over time for one or more video game characters, objects held by the video game characters, or any of a variety of other video game objects, including trees, vehicles, and the like. The user may also record various data used to generate various background components of the video game sequence, including, but not limited to buildings, mountains, sounds, various environmental data, timing data, collision data, and the like. The user may then use the game editor to edit portions of the recorded multi-dimensional video game world data.

In one embodiment, the user may be provided with a user interface such as described below that is configured to enable the user to select various joints for display using a motion trail. As described further below, the motion trail represents positions, displayed as position indicators, within a computer video game sequence in which a joint may be located within a given frame within the sequence. An example of a motion trail with displayed position indicators is described in more detail in conjunction with FIG. 5 below.

The user may modify the motion trail by replacing position indicators within the motion trail, deleting position indicators, adding new position indicators, and/or dragging position indicators to change a displayed location of the joint for one or more frames within the motion trail. By modifying the motion trail for one or more joints, the user may modify how an animated character within a game might be viewed. Moreover, in one embodiment, because multi-dimensional video game world data is recorded as that data used to compute a given image, rather than the video character image itself, the user may also change a viewing perspective of the animated scene, including the game character. For example, in a first execution and recording of the game, the user might display the game from a perspective of the game character. However, subsequent replaying and/or editing of the game based on the recorded multi-dimensional video game world data, the user may change the perspective to be watching the game character, in a third person perspective. In the third person perspective of the play of the recorded game based on the multi-dimensional video game world data, the user may select any of a variety of different views of the scene. Recording and editing of the recorded multi-dimensional video game world data is described in more detail below in conjunction with FIGS. 5-6.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple GRES 106, GS 107, and client device 101 w other computing devices, including potentially through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

GS 107 may include any computing device capable of connecting to network 105 to manage delivery of components of an application, such as a game application, or virtually any other digital content. In addition, GS 107 may also be configured to enable an end-user, such as an end-user of client devices 101-104, to selectively access, install, and/or execute the application, such as a video game.

GS 107 may further enable a user to participate in one or more online games. Moreover, GS 107 might interact with GRES 106 to enable a user of client devices 101-104 to record and/or edit state data from a video game execution. GS 107 might receive a registration of a user, and/or send the user a list of users and current presence information, such as a user name (or alias), an online/offline status, whether a user is in a game, which game a user is currently playing online, or the like, to client devices 101-104. In at least one embodiment, GS 107 might employ various messaging protocols to provide such information to a user. In one embodiment, GS 107 might further provide at least some of the information through a messaging session to one or more users. Thus, in one embodiment, GS 107 might be configured to receive and/or store various game data, user account information, game status and/or game state information, or the like.

One embodiment of a network device useable for GRES 106 is described in more detail below in conjunction with FIG. 2. Briefly, however, GRES 106 includes virtually any network computing device that is configured to enable a user to record video game state data as multi-dimensional video game world data during an animation motion capture, and to edit such recorded video game data. In one embodiment, GRES 106 may be configured to receive the video game state data from GS 107. In another embodiment, however, GRES 106 may be configured to include a various video game components, such as described in more detail below in conjunction with FIG. 2 to generate and/or play a video game. GRES 106 may record the multi-dimensional video game world data using a flat data structure. However, in another embodiment, the multi-dimensional video game world data may be recorded using a tree structure, a mesh structure, or the like, based on various components of a character, background, and/or other components within the video game world. GRES 106 may further enable a user to edit portions of the multi-dimensional video game world data using process such as described below in conjunction with FIG. 6.

Devices that may operate as GRES 106 and/or GS 107 include personal computers, desktop computers, multiprocessor systems, microprocessor-based or programmable consumer electronics, network PCs, servers, and the like.

Moreover, although GRES 106 and/or GS 107 are described as distinct servers, the invention is not so limited. For example, one or more of the functions associated with these servers may be implemented in a single server, distributed across a peer-to-peer system structure, or the like, without departing from the scope or spirit of the invention. Therefore, the invention is not constrained or otherwise limited by the configuration shown in FIG. 1.

Illustrative Network Device

Figure 2:
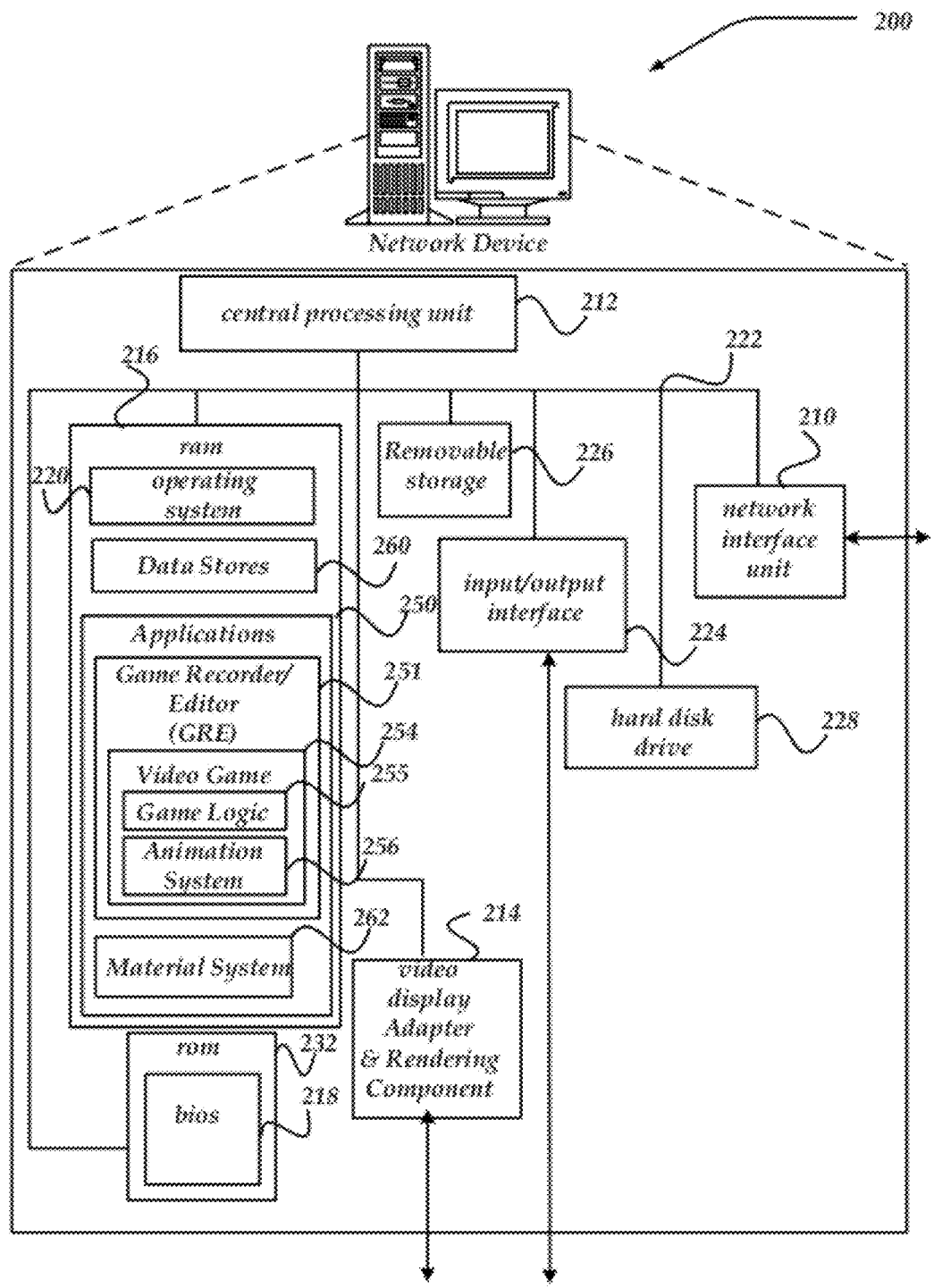
FIG. 2 is a block diagram of one embodiment of a network device that may be used for recording and/or editing of multi-dimensional video game world data.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, GS 107 integrated into GRES 106 of FIG. 1.

Network device 200 includes processing unit 212, video display adapter & rendering component 214, and a mass memory, all in communication with each other via bus 222. The rendering component of video display adapter & rendering component 214 is configured to calculate effects in a video editing file to produce a final video output that may then be displayed on a video display screen. Video display adapter & rendering component 214 may use any of a variety of mechanisms in which to convert an input object into a digital image for display on the video display screen. Network device 200 also includes input/output interface 224 for communicating with external devices, such as a headset, or other input or output devices, including, but not limited to joystick, mouse, keyboard, voice input system, touch screen input, or the like.

The mass memory generally includes RAM 216, ROM 232, and one or more permanent mass storage devices, such as hard disk drive 228, and removable storage device 226 that may represent a tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol, Wi-Fi, Zigbee, WCDMA, HSDPA, Bluetooth, WEDGE, EDGE, UMTS, or the like. Network interface unit 210 is sometimes known as a transceiver, transceiving device, or network interface card (NIC).

The mass memory as described above illustrates another type of computer-readable media, namely computer storage media. Computer-readable storage media may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. In one embodiment, the mass memory may include one or more applications 250 and one or more data stores 260. Data stores 260 include virtually any component that is configured and arranged to store data including, but not limited to user preference data, log-in data, user authentication data, game data, recorded and/or edited multi-dimensional video game world data, and the like. Data store 260 also includes virtually any component that is configured and arranged to store and manage digital content, such as computer applications, video games, and the like. As such, data stores 260 may be implemented using a database, a file, directory, or the like.

One or more applications 250 are loaded into mass memory and run on operating system 220 via central processing unit 212. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Applications 250 may also include a Game Recorder/Editor (GRE) 251, and material system 262. As shown, in one embodiment, GRE 251 may include video game 254, which includes various components including, but not limited to game logic 255 and animation system 256.

One embodiment of GRE 251 and video game 254 are described in more detail below in conjunction with FIG. 3. Briefly, however, GRE 251 is configured to enable a user to capture video game data that may subsequently be manipulated (or edited). GRE 251 is configured to provide user interfaces that enable a user to select various aspects of a video game to record and/or edit using animation motion capture of multi-dimensional video game world data. As such GRE 251 may interact with video game 254 to enable the user to play a portion of an animated sequence for a game. The user might further interact with video game 254 to modify the animation sequence to be recorded. GRE 251 enables the user to identify what state information is to be recorded as multi-dimensional video game world data. For example, the user might select to record virtually every aspect of the animation sequence, including every joint of each character, or other object within the sequence, sounds, coloring, material and/or textual changes, flex weights (which specify a weighting to employ when blending various morph targets) related to changes in a joint, and/or a variety of other information.

GRE 251 may then record the identified state information while the animation sequence is played (executes). During execution of the sequence, the user may manipulate one or more characters and/or objects within the game. For example, in one non-limiting example, the user might select to operate in a first person perspective as one of the game characters, and control the movements of that game character during the recorded game sequence. In another embodiment, one or more other game characters may be controlled, and therefore perform movements based on instructions from video game 254, and/or from another, previously recorded animation sequence.

The user may then employ GRE 251 to replay the game sequence that was recorded using the multi-dimensional video game world data. In one embodiment, the user may select to view the recorded game sequence from any of a variety of camera perspectives other than from that of the game character. For example, the user may change camera perspective while the recorded game sequence is being replayed. In one embodiment, the user may record the change to the camera perspective during the recorded game sequence, allowing for subsequent playback to appear to use a different camera perspective.

Figure 5:
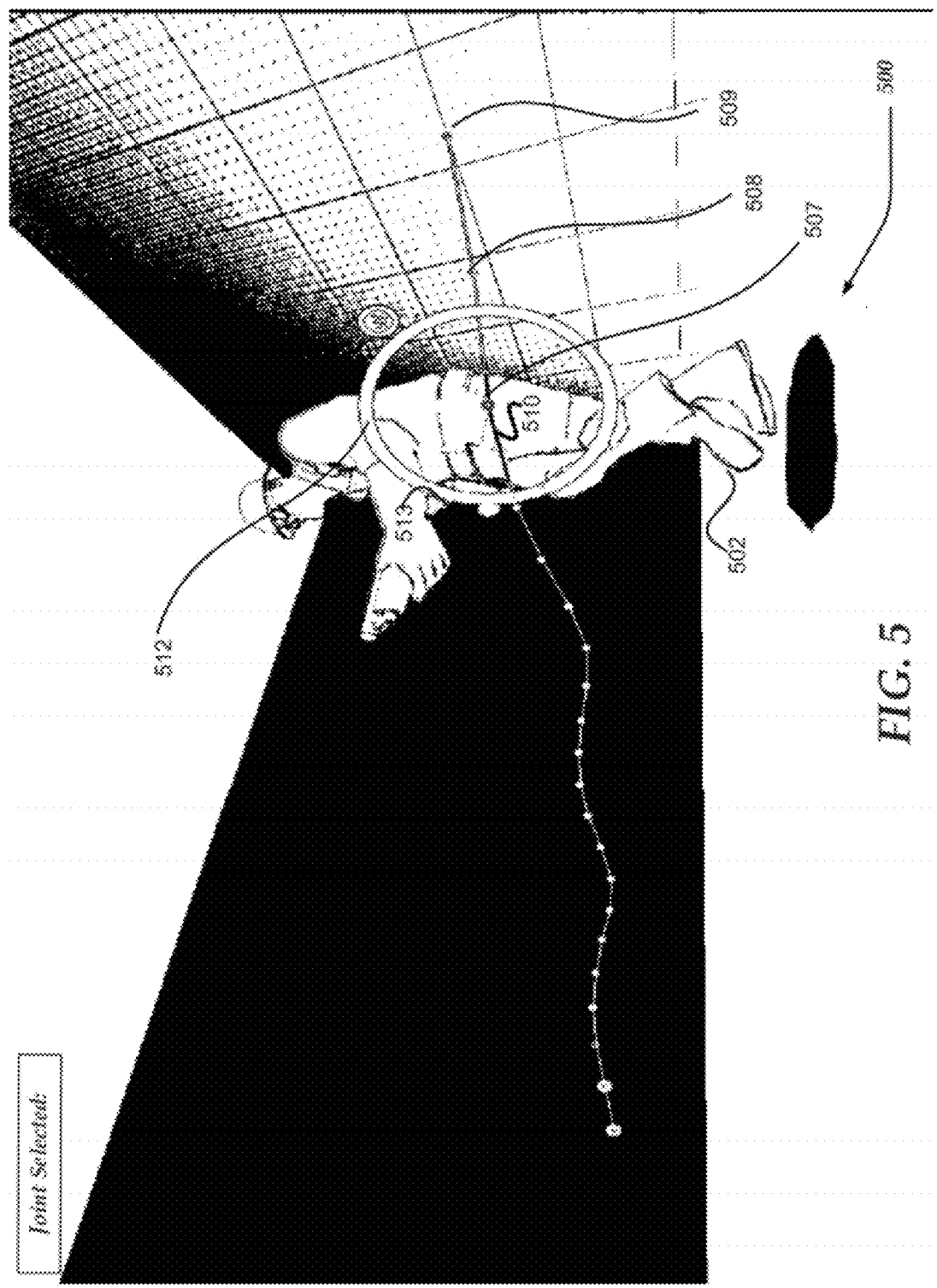
FIG. 5 is a non-limiting example of one embodiment of a video game display illustrating a recording sequence of one joint component.

GRE 251 further provides user interfaces to enable the user to edit the recorded game sequence using a variety of techniques. Because the game sequence is recorded using multi-dimensional video game world data obtained as the data used to compute an image, rather than the image itself, the user may make a variety of changes to the recorded game sequence. For example, the user might select to display a frame of the recorded game sequence using the multi-dimensional video game world data to recreate the display of the game. The user may further select for display one or more joints from a plurality of joints that were recorded during the execution of the game sequence. The user may then have overlaid onto the display a motion trail for the joint that represents positions in game space of the selected joint over time. In one embodiment, position indicators, such as circles, dots, or other symbols, may be used to indicate on the motion trail, the joint position in game space for each recorded frame. One non-limiting example of such a motion trail using position indicators is illustrated in FIG. 5.

The user may then employ GRE 251 to select some portion of the motion trail over time From within GRE 251, the user may further edit the motion trail, thereby changing the location of the joint in game space over time. For example, the user might select a position indicator on the motion trail, and drag the position indicator from a first position to a second position. In one embodiment, GRE 251 may smooth transitions between adjacent position indicators to the selected position indicator using a variety of mechanisms, including, but not limited to smoothing the transition between the underlying state data. For example, GRE 251 might automatically relocate adjacent position indicators based on a linear interpolation between position indicators on the motion trail. However, other mechanisms might also be used, including, but not limited to using a spike curve, a dome curve, a bell curve, ease in, ease out, ease in/out or the like, to smooth transitions between position indicators.

In one embodiment, GRE 251 automatically reflects the change in position by displaying in real-time, how the game character associated with the joint might appear in the second position. In one embodiment, the user may play, randomly access, or scrub forward or reverse, the selected sequence with the modification to view how the changed game sequence might now appear.

However, the invention is not limited to merely enabling the user to select and drag one or more position indicators on the motion trail. GRE 251 also enables the user to replace one or more portions of the motion trail with another game sequence, delete portions of the game sequence, insert other game sequences, or any of a variety of other game editing operations. For example, GRE 251 also enables a user to play a recorded game sequence using recorded multi-dimensional video game world data, and to composite one or more other characters onto the recorded game sequence during its execution. The composited game sequence may then be recorded using GRE 251 for subsequent editing using composited multi-dimensional video game world data.

Video game 254 is configured to manage execution of a video game for display at, for example, a client device, such as clients 101-104 of FIG. 1. In one embodiment, components of video game 254 may be provided to the client device over a network. In another embodiment, video game 254 may be configured to execute a video game on network device 200, such that a result of the execution of the video game may be displayed and/or edited at a client device.

Video game 254 includes game logic 255 and animation system 256. However, video game 254 may include more or less components than illustrated. In any event, video game 254 may receive, for example, input events from a game client, such as keys, mouse movements, and the like, and provide the input events to game logic 255. Video game 254 may also manage interrupts, user authentication, downloads, game start/pause/stop, or other video game actions. Video game 254 may also manage interactions between user inputs, game logic 255, and animation system 256. Video game 254 may also communicate with several game clients to enable multiple players, and the like. Video game 254 may also monitor actions associated with a game client, client device, another network device, and the like, to determine if the action is authorized. Video game 254 may also disable an input from an unauthorized sender.

Game logic 255 is configured to provide game rules, goals, and the like. Game logic 306 may include a definition of a game logic entity within the game, such as an avatar, vehicle, and the like. Game logic 255 may include rules, goals, and the like, associated with how the game logic character may move, interact, appear, and the like, as well. Game logic 255 may further include information about the environment, and the like, in which the game logic character may interact. Game logic 255 may also include a component associated with artificial intelligence, neural networks, and the like. As such, game logic 255 represents those processes by which the data found in multi-dimensional video game world data are evaluated to be at a correct state for a given moment of the video game world play, including which state should all the game world entities be in, which sound should be played, what score should a player have, what activities are the characters trying to act on, and the like.

Animation system 256 represents that portion of video game 254 that takes output of game logic 255 and poses animated elements in a state suitable for rendering. This includes moving character joints into a position to make it look like they are performing some action, or the like. As such, in one embodiment, animation system 256 may include a physics engine or subcomponent that is configured to provide mathematical computations for interactions, movements, forces, torques, flex weights, collision detections, collisions, and the like However, the invention is not so limited and virtually any physics subcomponent may be employed that is configured to determine properties of entities, and a relationship between the entities and environments related to the laws of physics as abstracted for a virtual environment. In any event, such computation data may be provided as output of animation system 256 for use by GRE 251 as portions of the plurality of multi-dimensional video game world data that may be recorded and/or modified.

In one embodiment, animation system 256 may include an audio subcomponent for generating audio files associated with position and distance of objects in a scene of the virtual environment. The audio subcomponent may further include a mixer for blending and cross fading channels of spatial sound data associated with objects and a character interacting in the scene. Such audio data may also be included within the plurality of multi-dimensional video game world data provided to GRE 251.

Material system 262 is configured to provide various material aspects to a video input, including, for example, determining a color for a given pixel of a rendered object, or the like. In one embodiment, material system 262 may employ various techniques to create a visual look of game world surfaces to be rendered. Such techniques include but are not limited to shading, texture mapping, bump mapping, shadowing, motion blur, illuminations, and the like.

Non-Limiting Example of Data Flow Within A Video Game System

Figure 3:
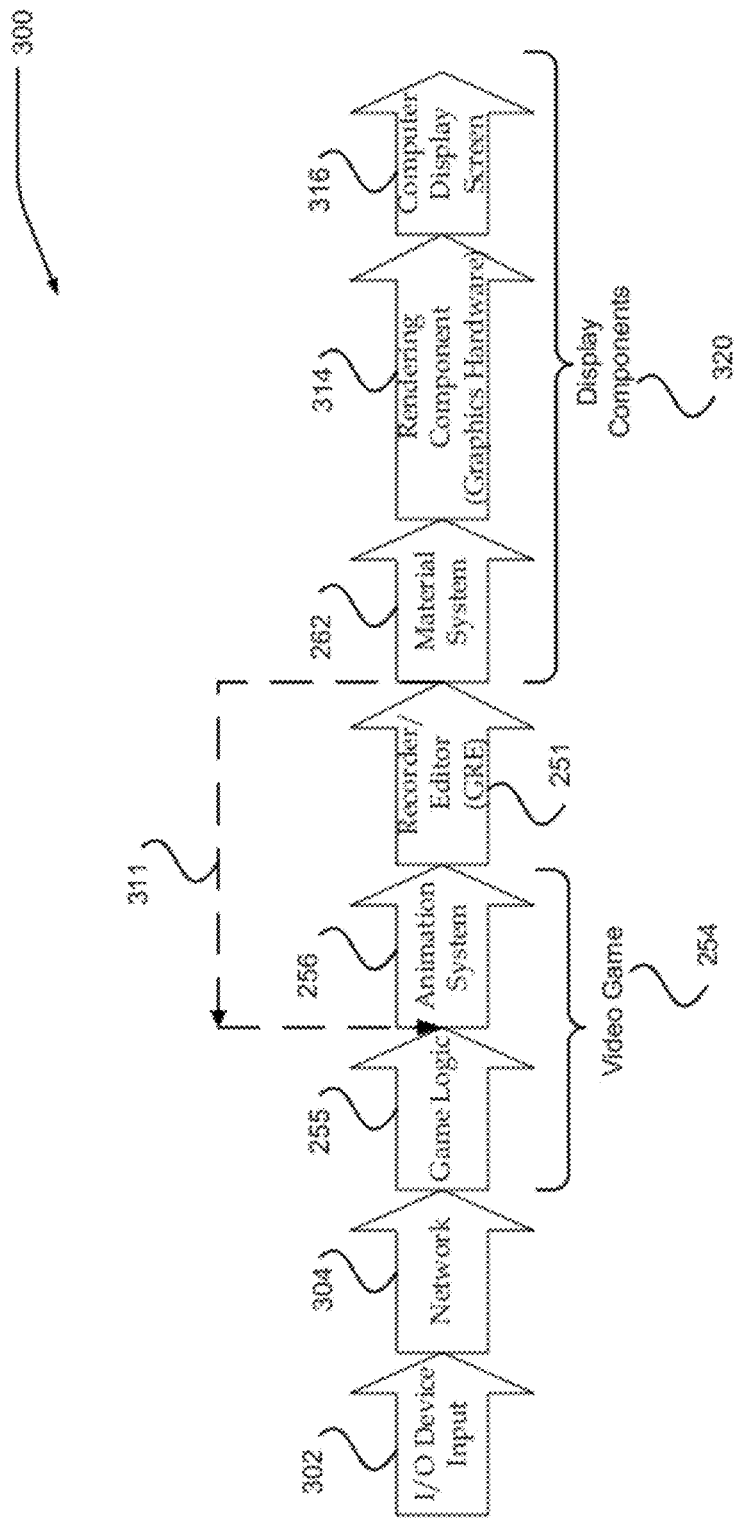
FIG. 3 is a block diagram illustrating one embodiment of a relationship between various components within the network device of FIG. 2 that are useable for at least capturing a plurality of components of a video game world within a recorded video game sequence, modifying at least some of the captured components, and feeding the modifications into the video game and/or a material system for use in modifying a display of the video game sequence.

FIG. 3 is a block diagram illustrating one embodiment of a relationship between various components within the network device of FIG. 2 that are used to capture a plurality of components of a video game world within a recorded video game sequence, modify at least some of the captured components, and to feed the modifications into the video game and/or a material system for use in modifying a display of the video game sequence. The components illustrated in system 300 of FIG. 3 may be implemented within GS 107 and/or GRES 106 of FIG. 1.

System 300 may include more or less components than those shown. The components shown, however, are sufficient to disclose an illustrative embodiment for practicing the invention. Moreover, while system 300 discloses one embodiment of distributing functions of a video game system across different components, the invention is not to be construed as so limited. Other distributions of functions across components may also be employed. For example, one or more components illustrated may be combined into a single component. Moreover, one or more components might not be employed. For example, network component 304 might not be employed in another embodiment.

However, as illustrated system 300 includes I/O device input 302, network 304, video game 254 that includes game logic 255 and animation system 256, GRE 251, material system 262, rendering component 314, and computer display screen 316, each of which are described in more detail above in conjunction with FIG. 2. For example, rendering component 314 represents the component of video display adapter & rendering component 214 of FIG. 2 that is useable to render an image to computer display screen 316. Similarly, I/O device input 302 represents one embodiment of input/output interface 224 of FIG. 2. Moreover, material system 262, rendering component 314 and computer display screen 316 may collectively be referred to a display components 320.

System 300 is intended to portray one embodiment of a flow of data through the various components for use in managing a video game play. That is, as shown, a user might employ various input devices, such as those described above, to input into various motions, actions, and the like for use by video game 254. For example, in one embodiment, the user might move a mouse; enter data through a keyboard, touch screen, voice system, or the like; move a joystick; or any of a variety of other devices useable to manipulate a game state within a video game sequence. The input from the user is provided through I/O device input 302 over network 304 to video game 254. In one embodiment, such user input may affect various states within the video game, resulting in updates by game logic 255. Game logic 255 provides updates to the video game world state to animation system 256 which in turn is used to pose various characters based on the modified game logic output. As shown, GRE 251 may intercept output from the animation system that includes data for a plurality of multi-dimensional video game world components, including data used to compute a character image. By intercepting the data used to compute the character image rather than the image itself, GRE 251 provides a user more flexibility over traditional approaches in modifying a game state sequence.

Output from GRE 251 may be fed back into video game 254, as shown by feedback 311, for revising the image data as represented by the plurality of multi-dimensional video game world component data. Output from GRE 251 may also be provided to material system 262 where coloring, shading, and other texturing actions may be performed on the data. The output of material system 262 may then be provided to the rendering component 314 to render the data into an image for display by computer display screen 316.

While GRE 251 is illustrated as capturing output from animation system 256, the invention is not so limited, and GRE 251 may also capture data from other components as well, including, but not limited to I/O device input 302, and/or game logic 255.

Data flow through system 300 may be further described using as a non-limiting, non-exhaustive example, of a "first person shooter" type of game. In this game example, then, while watching computer display screen 316, a user plays the first person shooter game using I/O device input 302 to provide inputs to the game. The user's inputs are then sent through network 304 to game logic 255, which decides if the player hit a target within the game or not. Animation system 256 may then pose a skeleton of a game character, triggers the gunshot sound and starts a particle system within animation system 256. All this information, including outputs from animation system 256 is then recorded by the GRE 251 before being passed to material system 262. Material system 262 upon receiving the data from animation system 256 prepares the scene for the rendering component 314 by adding lights, textures, shaders, and the like, to the scene. All this data is then output back to computer screen 316 for the user to decide whether to shoot again, and/or to perform some other action using I/O device input 302.

After the recording has stopped, the entire experience can be replayed, in one embodiment, by replacing the user's I/O device input 302, network 304 data, and game logic 255 data with the recorded data as fed back using flow 311. Although the experience is now a playback of an GRE recording, it remains representative of the original experience since the data is fed back to the same display systems as the original experience (e.g., components 262, 314 and 316).

In one embodiment, by replaying the video game employing previously recorded multi-dimensional video game world data, compositing may also be performed. That is, additional content may be overlaid onto the previously recorded multi-dimensional video game world data to create a new sequence that combines the previously recorded game world data with additional new content. Such iterations and layering of multiple sequences of game world data may be termed a compositing cycle.

Such compositing cycles include executing the video game 254 to initially generate a sequence of multi-dimensional video game world data. As noted, elsewhere, while sequence may employ a video game, other output sequences may be generated, including, for example, other multimedia presentations. In any event, the generated sequence may be used to create a movie, a poster, comics, or the like. For example, a sequence from a video game play may be captured and packaged as a movie clip, such as a car action sequence.

As noted above, the recorded multi-dimensional video game world data includes various audio-visual components of the video sequence, such as wireframe/skeleton of characters and objects, positional information, game states, motion curves and characteristics, object visibility status, start/stop timing of sounds, material changes, state of material, material texture, particle information, physics information, context, and timestamp data, among others.

In any event, once a sequence is recorded, a new game play may be created using GRE 251. GRE 251 may use some or all of the multi-dimensional video game world data that was recorded. In one illustrative embodiment, a non-linear editor (NLE) action may be used to randomly edit different points of the recorded sequences, corresponding to different times, without having to sequentially rewind or move forward in a frame sequence. Other types of editors (or types of editing), such as a sample editor or an in-context editor may also be used.

The result of the editing of multi-dimensional video game world data is a new sequence combined with the previously recorded sequence. Continuing with the car racing game as an illustrative example, the captured sequence may show a yellow race car moving down the second lane. GRE 2251 may be used to create the new sequence having a red race car moving down on the fifth lane behind the yellow race car. Other aspects of the sequence may remain unchanged. That is, at least some of the previously recorded sequence may be considered as persistent from one compositing cycle to a next compositing cycle. Accordingly, the addition of the red race car in the new sequence might not alter anything about a position or other data relating to the yellow race car, For instance, if the tires of the yellow race car were smoking from acceleration in the captured sequence, the new sequence that now adds the red race car will include the yellow race car with smoking tires as well. In any event, in one embodiment, the addition of the red race car may be performed by a user by interacting with I/O device input 302 to control actions of the added race car. In this way, additional actions may be layered over the previously recorded and currently played sequence, so as to blend the current actions onto or with the previously recorded sequence.

After the new sequence is generated, a next step in the compositing cycle may include integration of the new sequence with the existing sequence(s). In one embodiment, each sequence may be converted to a new bitmap image layer that is superimposed on top of a previous image layer. Various techniques may be used to superimpose the different layers of images/graphics. Other processing may be performed on the image layers before integration with other layers. For example, layers may be alpha-blended for various degrees of transparency to show or hide backgrounds, various types of filters may be applied to enhance the image (for example, filters to smooth or clean up photographic images), and lighting and shading may be applied.

In another illustrative embodiment, the new sequence may be created and represented by vectors and be combined with other sequences using vector operations and transformations. Vector operations and transformations may include rotation, movement, mirroring, stretching, skewing, and/or various set operations such as unions, intersections, or the like. Different sequences may be integrated by combining vector representations of individual sequences.

In yet another embodiment, vector and bitmap graphics may be combined. This may be performed, for example, where the new sequences are initially generated using vector graphics and later are converted to a bitmap image for integration, display, storage, or the like.

The compositing cycle may then comes be repeated after the integration of the new sequence with the previous sequence(s). The compositing cycle described above may be repeated to layer or combine multiple sequences as often as desired to produce a composited sequence of multiple sequences.

Multi-Dimensional Video Game World Components

Figure 4:
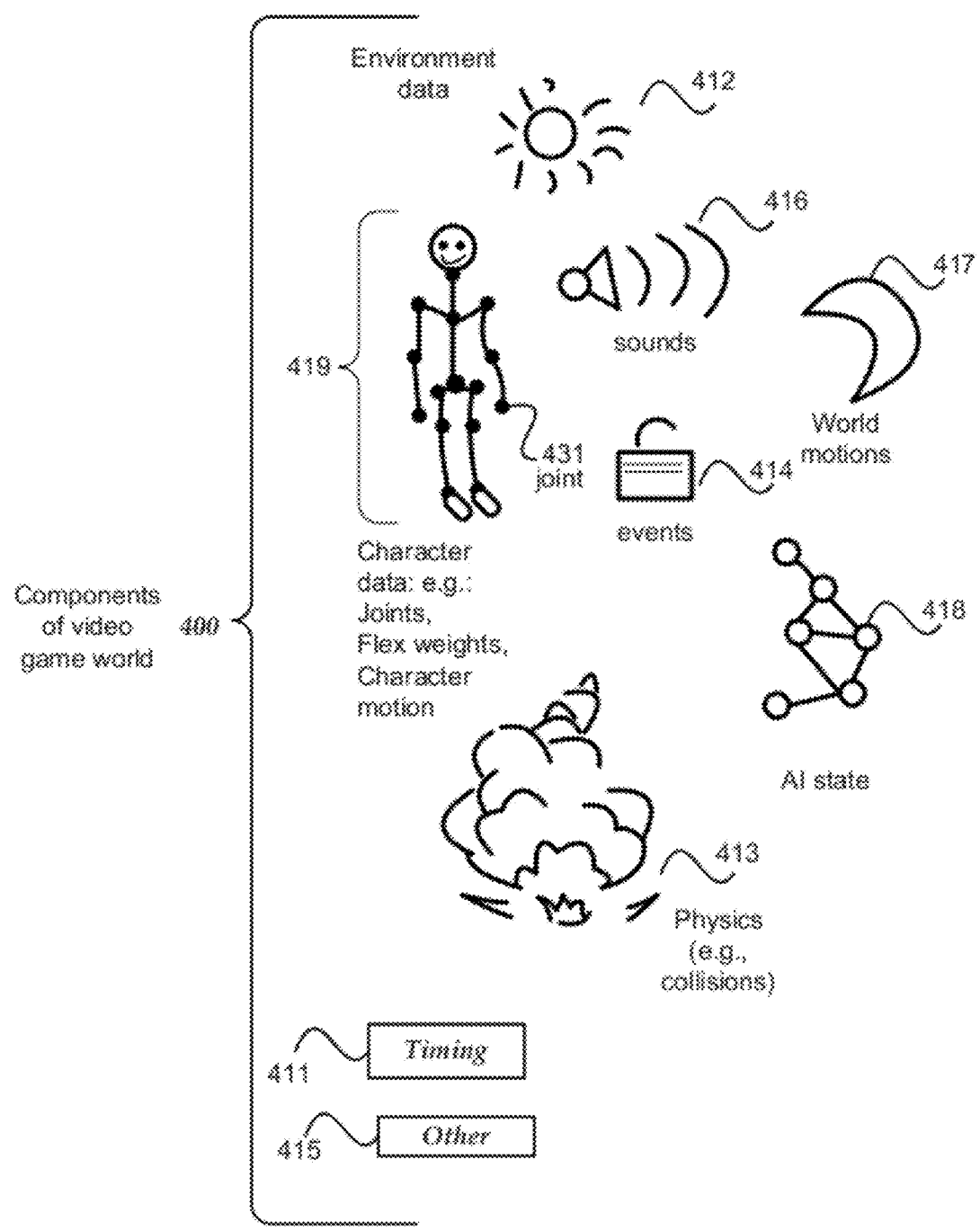
FIG. 4 is one embodiment of non-limiting, non-exhaustive examples of a plurality of components of a video game world.

FIG. 4 is one embodiment of non-limiting, non-exhaustive examples of a plurality of components of a video game world for which a plurality of multi-dimensional video game world data may be obtained. Components 400 may include many more components than those shown. The components shown, however, are sufficient to disclose an illustrative embodiment for practicing the invention.

Components 400 represents various components of game state data that may be obtained during animation motion capture. The recorded multi-dimensional video game world data typically is received from one or more components of a video game during execution of an animated motion sequence. In one embodiment, the multi-dimensional video game world data obtained for components 400 includes one or more sets of data such as polygonal mesh data, joint hierarchies, material settings, AI state, particle system data, sound effects, sound triggers, camera placements, and/or virtually any game world state data employable to generate a virtual game world experience. Thus, the components illustrated are not to be construed as limiting, and others may also be used.

In any event, components 400 includes, timing data 411, material/textual changes 412, physics state data 413, visibility data 414, sound data 416, motion data 417, collision data 418, joint data 419, flex weight data 420, and other data 415 associated with the recorded game sequence. The other data 415 may include, but is not limited to wireframe/skeleton data, positional information, motion curve data, or the like. Virtually any data about the game scene over time may be recorded. As such, unlike merely recording triggers and events over time of a game sequence, components 400 represents a dense capture of multi-dimensional video game world data, in the sense that a large amount of details about a single component may be collected.

Thus, the multi-dimensional video game world data includes not only audio-visual aspects of the scene, but also other information such as wireframe/skeleton of characters and objects, positional information, game states, motion curves and characteristics, object visibility status, start/stop timing of sounds, material changes, state of material, material texture, particle information, physics information, context, and timestamp data, among others.

Besides the data used for creating the images and sounds that are captured, other data dimensions representing game state information such as motion, collision information, wireframe/skeleton data, timestamps, z-order of objects, and other such information may also be captured or extracted and stored for creating the new scene shot in a compositing cycle. The game state information generally includes information about objects and sounds included in the scene, and additionally, information about the scene itself that relate to all objects within the scene, such as scene location and time information.

Thus, such multi-dimensional video game world data enables a comprehensive and relatively easy and quick manipulation of objects and characters in the scene using the disclosed animation editor. Moreover, the captured data represented by components 400 may be stored in a file on a computer file system, or alternatively on an external computer-readable medium such as optical disks. In one embodiment, the multi-dimensional video game world data represented by components 400 may be initially recorded in a plurality of distinct data logs and then transferred and/or manipulated into another format, structure, or the like.

In one embodiment, components 400 may be implemented in a flat file format such that state data for each frame in the animated game sequence may be separately recorded. That is, the state data for any given frame is complete and independent of another set of state data from any other recorded frame. As such, a scene within the recorded game sequence may be fully recreated from the recorded state data for that frame. In one embodiment, multi-dimensional video game world data for each distinct frame may be stored in a distinct or different data log.

Non-Limiting Video Game Motion Trail

FIG. 5 is a non-limiting, non-exhaustive example of one embodiment of a video game display illustrating a recording sequence for one joint over time using a motion trail. Display 500 may include many more components than those shown. The components shown, however, are sufficient to disclose an illustrative embodiment for practicing the invention.

As shown, game character 502 may be illustrated within a given scene, including backgrounds, and the like. In one embodiment, display 500 may represent a single frame from the recorded game sequence, recreated from the recorded multi-dimensional video game world data.

Further illustrated is motion trail 510 for a selected joint 507. As seen, motion trail includes a plurality of position indicators, such as 507-509 indicating a location within game space of the selected joint 507 over time. In one embodiment, the motion trail 510 may represent changes of the selected joint 507 over the entire recorded game sequence, each change being recorded as multi-dimensional video game world data within a distinct data log for a given frame. However, in another embodiment, motion trail 510 may be a selected subset (e.g., a "time selection") of the recorded positions of selected joint 507. Motion trail 510 may be drawn onto display 500 to provide the user with a visual cue of transitions between position indicators. Computing motion trail 510 through the recorded positions of joint 507 as represented by the position indicators may be performed using virtually any mechanism.

As further shown, a user may be provided with a selector tool, such as selector ring 512. The user may employ selector ring 512 to select a range of position indicators to manipulate, zoom in/out on, or the like. In one embodiment, selector ring 512 may include a pivot handle 513 useable to rotate, drag, or otherwise further manipulate one or more enclosed position indicators. For example, in one embodiment, selector ring 512 may be centered onto position indicator 507, as shown by the rectangle over position indicator 507. The user may then employ pivot handle 513 to drag position indicator 507 from a first location to a second location, thereby modifying the displayed motion trail 510. As used herein, a "pivot" refers to a point around which a joint may rotate. By default, in one embodiment, the pivot or pivot point is the joint itself, but it can be moved to accommodate more complex rotations.

Thus, as illustrated, a user may select a specified frame based on a selected position indicator 507-509 within a recorded plurality of frames from within the recorded video game sequence that is stored within the plurality of distinct data logs. The user may then edit the sequence using the data log editor and such as described above, to edit at least some of the recorded multi-dimensional video game world data within at least one of the distinct data logs for a specified frame range. The user may then send the results to a material system and/or fed back the results of the editing to the animation system, and/or game logic components of the video game system to have the modified sequence displayed for the at least the specified frame range.

It should be noted, however, that the user is not limited to dragging position indicators within a motion trail. For example, the user may also select to delete position indicators, add position indicators, insert within a motion sequence into the recorded game sequence, or the like. Additionally, different types of manipulation may be selected by the user for the motion trail, including: (1) Replacement—an animation is replaced by a non-animated state such as a pose; (2) Transform—an animation is globally modified where the motion trail is shifted without changing the shape of the motion trail; and (3) Offset—an animation that is locally modified and where the motion trail is modified relative to itself.

Generalized Operation

Figure 6:
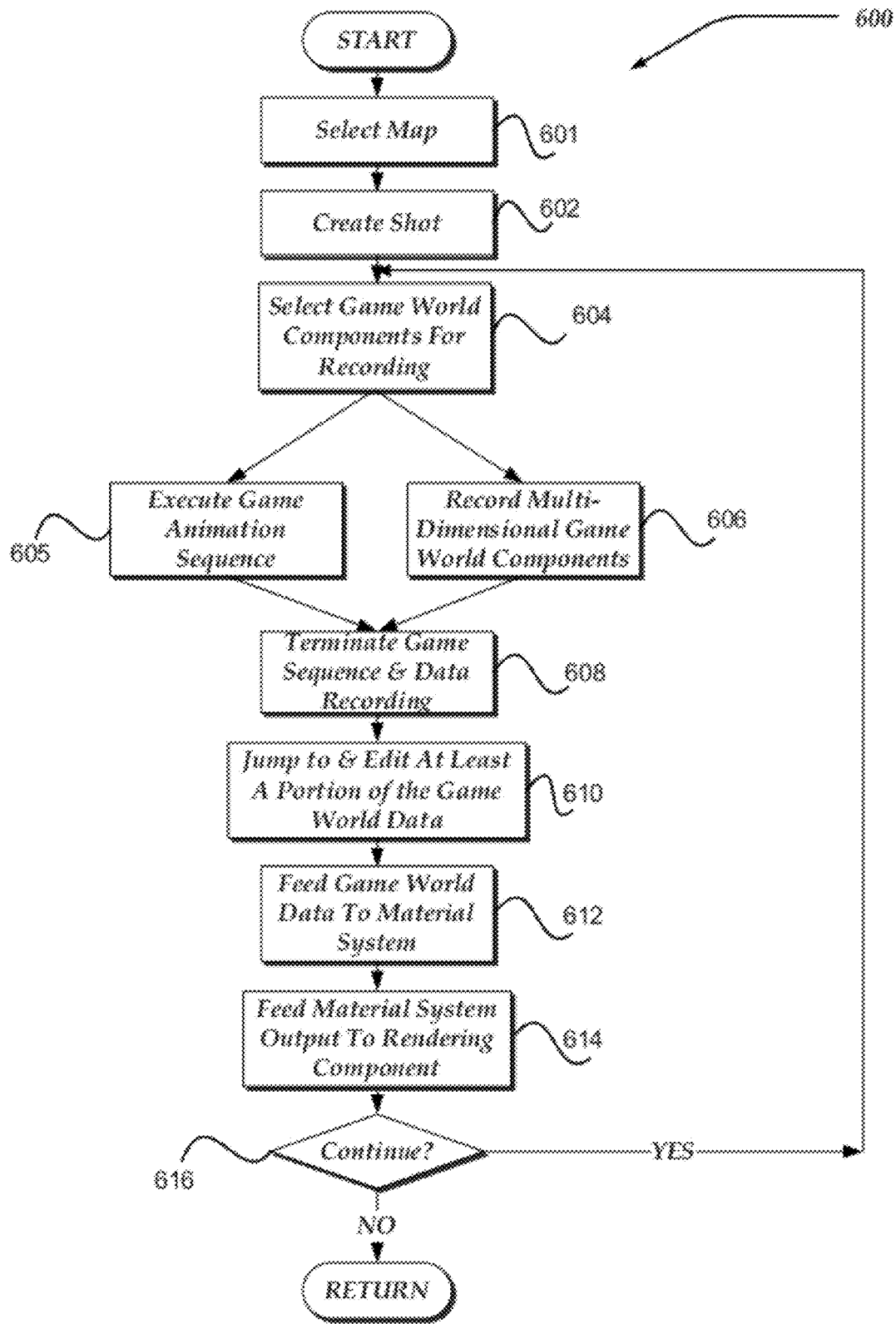
FIG. 6 is a flow diagram illustrating one embodiment of an overview of a process useable for recording and editing multi-dimensional video game world data.

The operation of certain aspects of the invention will now be described with respect to FIG. 6. FIG. 6 is a flow diagram illustrating one embodiment of an overview of a process useable for recording and editing multi-dimensional video game world data. Process 600 of FIG. 6 may be implemented within network device 200 of FIG. 2, in one embodiment.

Process 600 begins, after a start block, at block 601 where a user selects a given map or video game to be played, including a game environment, such as a game scene, and one or more video game characters to be placed within the game scene for executing of a game sequence. Proceeding to block 602, the user may then select or otherwise create a given video sequence to be shot. In one embodiment, the given video sequence may be a subset of the given map selected within block 601. In at least another embodiment, each shot may be created with a separate map, and game world component data can be recorded multiple times into the same shot. Continuing to block 604, the user may further select one or more joints for recording as multi-dimensional video game world component data. That is, in one embodiment, the user identifies a plurality of components to be recorded with the video game world of block 601, where each component within the plurality is to be recorded within a distinct frame by frame data log to generate a plurality of different data logs.

In one embodiment, a default configuration may include recording of every joint within the game scene and/or on the game character. Such joints may be predefined during creation of the game character. For example, joints may be defined as pivot points between two 'hands" of a skeleton structure. However, joints may also be defined by other desirable recording points on an animated structure. For example, for an leg, the joint points might include a knee control, but not be limited to the clothing, shoelaces, hemlines of a skirt, kneepads, or the like. For a vehicle, the joint points might include, but not be limited to several points along a radial arm of a tire, such as an outside point and/or a center point of a tire. Clearly, other joints may be identified than these examples illustrate, and thus the invention is not to be construed as being limited by such examples.

In any event, in one embodiment, the game character may be controlled by the user. That is, the user may provide various inputs using a mouse, keyboard, audio input, a joystick, or the like, to control movement of the game character. Movement of the game character is anticipated in resulting in movement of joints on the game character. In one embodiment, a display of the game sequence may be shown on the user's computer display device. In one embodiment, the game sequence may employ a first person perspective or camera position. That is, in one embodiment, the user may view actions of the game character from the perspective of the game character, in a perspective sometimes known as a first person "shooter" perspective.

Processing flows next to blocks 605 and/or 606 where the user may select to execute the game logic and game animation to enable a display on a computer display device a sequence of movements over a plurality of frames within the video game world. At block 605, in at least one embodiment, the executing of the game animation and game logic may generate game world component data from the game. Also, in at least one embodiment, the game world component data may be imported as a sequence, e.g., copied from game assets in a manner similar to applying animation presets.

In one embodiment, the user may employ the game recorder, described above, to record some or all of the game animation as animation motion capture by recording multi-dimensional video game world component data, including the one or more selected joints. That is, in one embodiment, while executing the movements during the video game sequence of the video game, the user records within each of the distinct plurality of different data logs multi-dimensional video game world data for the identified plurality of components prior to rendering each frame.

Block 606 may be entered concurrent with block 605, or subsequent to/ or even before execution of the game sequence. Moreover, the user may select to stop recording concurrent with, or even before completing execution of the game sequence.

Processing then flows to block 608, where the user may terminate the game sequence and/or the recording of the multi-dimensional video game world component data. Processing continues next to block 610, where the user may play back the recorded game sequence using the recorded multi-dimensional video game world component data. That is, in one embodiment, the user may perform a jump to a specified frame within the recorded plurality of frames from within the recorded video game sequence stored within the plurality of distinct data logs. As used herein, jumping refers to a process of selecting and accessing a specified frame based on some identifier, such as a time, play sequence identifier, or the like. It should be noted, however, that the user is not limited to proceeding to block 610, and although not illustrated, the user may cycle through blocks 605 and/or 606 as often as desired, before selecting to play back the recorded game sequence. Moreover, the user may also loop back to block 602 and/or 604 to select different scenes, game characters, joints for recording, or the like, without departing from the scope of the invention.

In one embodiment, at block 610, the user may replay the previously recorded game sequence while further adding additional characters, actions, or the like, over the previously recorded game sequence. In this manner the user may form a composite of the previously recorded game sequence with additional actions, characters, changes in a camera perspective, changes in positions of existing characters, changes in characteristics of a character such as facial expressions, explosions, water actions, or virtually any other video game data onto the previously recorded game sequence to generate a new sequence that composites the 'new' content, with the previously recorded game sequence.

In any event, at block 610, the user may then select one or more portions of the recorded game sequence for editing. That is, using a data log editor such as described above, the user may edit at least some of the recorded multi-dimensional video game world data within at least one of the distinct data logs within the plurality of data logs for a specified frame range.

When the game sequence (e.g., movie) is ready to be published and distributed, we save out an image sequence for the entire movie and an associated audio file to be played in sync in commonly found venues, such as on the internet, television, theatres, DVDs, or the like. At this point, the process steps through the movie, frame by frame, constructing the final frame using the logic found in display components 320 in FIG. 3, and then saves the screen output into a single image file, which may then be saved to, such as data stores 260 of FIG. 2, or other computer-readable storage medium.

The user may select any of a variety of editing mechanisms, including, but not limited to compositing the recorded game sequence with another game sequence and/or game characters, inserting a portion of a game sequence into the recorded game sequence, deleting portions of the recorded game sequence, and/or manipulating portions of the game sequence, for example, by modifying portions of a motion trail for a joint. A modification to one or more portions of the motion trail for the joint may include, but are not limited to, orientation, position, and rotation of the joint. As noted, however, the user is not limited to merely these manipulations, and others may also be performed, including modifying a camera perspective of the recorded game state data, for example. Thus, because the present invention is directed towards recording multi-dimensional video game world component data that includes that data used for calculating an image rather than the image itself, a plurality of different manipulations may be performed that might not otherwise be available by recording triggers and events from the triggers.

Proceeding to block 612, the user may then have the results of the edits sent to the material system within the network computing device the recorded multi-dimensional video game world data within each of the distinct data logs including the at some edited data within at least one of the distinct data logs to display a modified video game sequence for the specified frame range. As noted above, however, the results may also be fed back to the animation system for further updates to the multi-dimensional video game world component data. Proceeding next, the output of block 612 may be sent to the block 614 to be rendered into an image.

Process 600 may then flow to decision block 616, where a determination is made whether to continue recording and editing the multi-dimensional video game world component data. If so, then processing loops back to block 604 where the user may further select one or more joints for recording as multi-dimensional video game world component data. If process 600 is to be terminated, however, processing then may return to another process to perform other actions.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Illustrative Example of Compositing

Figure 7A:
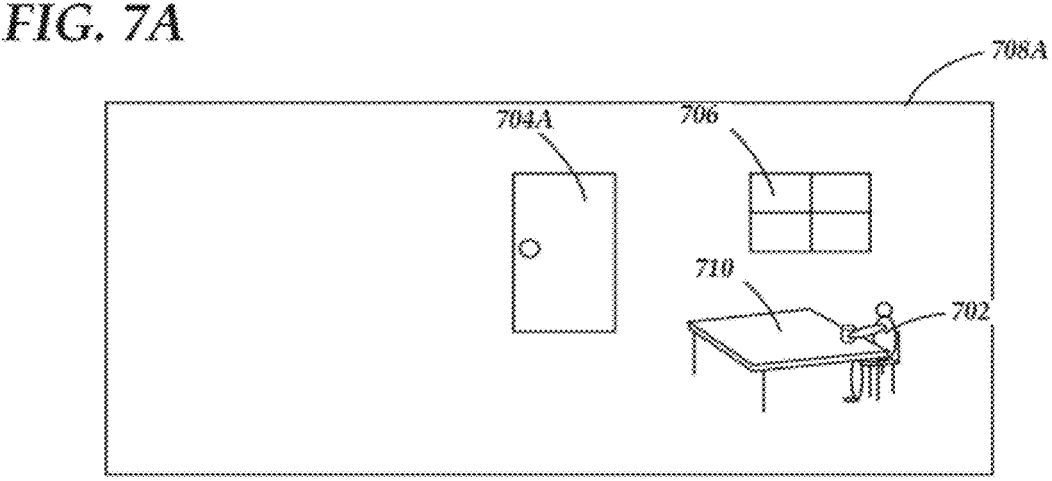
FIGS. 7A-7C illustrating one non-limiting, non-exhaustive example of modifying the recorded multi-dimensional video game world by compositing individual scenes.
Figure 7B:
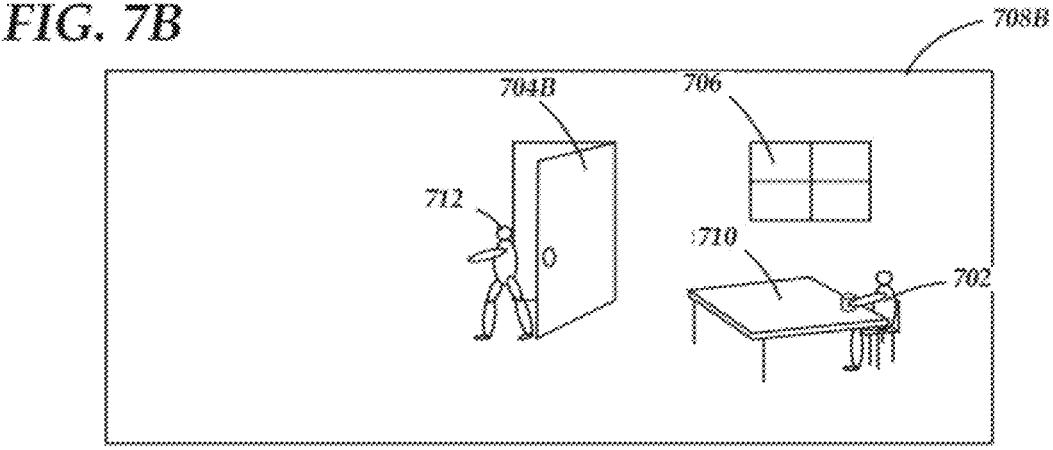
Figure 7C:
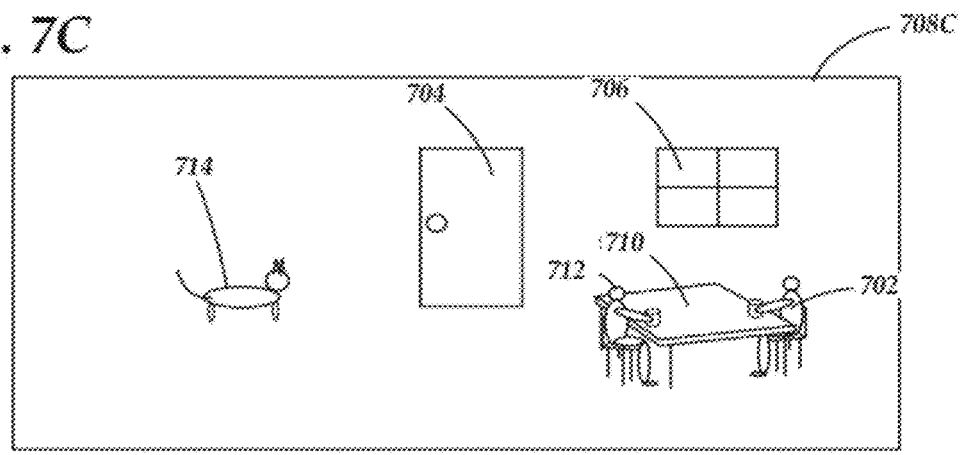

FIGS. 7A-7C illustrate one non-limiting, non-exhaustive example of compositing multiple sequences to generate a new composited sequence. Generally, a first sequence may be based on any multimedia content such as a video game. For example, as shown in FIG. 7A, the user may start with a sequence of a room 708A that may include door 704, window 706, and a first character 702 sitting at table 710. Such sequence might have been generated by performing blocks 601-608 of process 600 described above to record multi-dimensional video game world data for the illustrated sequence.

Then, the user may replay the recorded multi-dimensional video game world data while providing additional content and/or changes to the recorded multi-dimensional video game world data. For example, as illustrated in FIG. 7B, a user may create a new sequence during replay of the previously recorded sequence by, for example, adding a second character 712 that opens door 704B, enters room 708B. The user may perform various actions, such as layering another previously recorded sequence that includes the new second character 712, or performs interactive actions to control movement of the second character using various I/O device inputs. Thus, for example, the user may have second character 712 enter the room and walk over to the table 710.

While replaying the previously recorded sequence and adding the additional actions of the second character, a new sequence of actions may be created and thereby recorded as a composite of the combination. Thus, the new sequence may be constructed by the combination of the previously recorded with new actions.

This new composited sequence may be again replayed, to add and/or alter the newly recorded composited sequence. For example, as illustrated in FIG. 7C, another character may be added, cat 714. In one embodiment, the user may again, select to employ various I/O input devices to control actions of cat 714 as the previously composited sequence is played. Further, the combination of the previously composited sequence with the now additional content may be recorded and/or otherwise combined to create yet another composited sequence. Using process 600 such layering of sequences may be performed as often as a user desires.

It should be noted that the invention is not limited to including a single character or varying a single portion of the sequence during each replay, and multiple characters, actions, or the like, may be included during each re-play and compositing cycle. Moreover, in at least one embodiment, newly created content may be separately recorded from the previously recorded sequence. In this manner, the compositing may be performed as a separate action.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for compositing content for a video game world with a network device, the method enabling actions, comprising:
   identifying a plurality of components of video game world data for recording within the video game world;
   executing a sequence of animation for the video game world for subsequent display in a plurality of video game frames, wherein the sequence of animation includes at least one identified component;
   recording the video game world data for at least one of the identified plurality of components, wherein at least a portion of the video game world data is generated by the execution of the sequence of animation and recording the video game world data occurs prior to a rendering and display of the plurality of video game frames such that the recorded video game world data is to be rendered in order to generate a displayable video game image, wherein the video game world data associated with each video frame is stored in a flat file format, and wherein the video game world data associated with each video frame includes a distinct data log recording changes of a selected joint over a predetermined game sequence, wherein the video game world data is configured such that the distinct data log of a frame is independent from another frame;
   identifying the content for compositing on at least one video game frame;
   compositing at least one selected video game frame with the identified content;
   replaying and recording new video game world data generated by the execution of at least a portion of the sequence of animation corresponding to the at least one selected video frame composited with the identified content prior to rendering, recording and displaying the plurality of video game frames; and
   providing the newly recorded video game world data to a material system prior to a subsequent display of at least the portion of the sequence of animation that corresponds to the at least one selected video game frame composited with the identified content.

2. The method of claim 1;
   wherein the video game world data comprises environment data, character data, physics data, game world motion data, sound data, event data, non-sampled parameter data, and timing data from the video game world prior to submission to the material system.

3. The method of claim 1;
   wherein compositing further comprises layering another composited video game frame with the identified content with a previously composited video game frame.

4. The method of claim 1, further comprising:
   displaying a motion trail in the displayed plurality of video game frames for at least one selected joint of a video game character, wherein the motion trail further displays a change in at least one of a location and an orientation for the at least one selected joint over time.

5. The method of claim 1;
   wherein the material system determines a change in shading of at least one object in the video game world based on the recorded video game world data.

6. The method of claim 1;
wherein the material system determines a change in occlusion of at least one object based on the new video game world data.

7. A network device for compositing content for a video game world, comprising:
a memory configured to store data;
a processor that is operative to execute the data stored in the memory that enables actions to be performed, comprising:
identifying a plurality of components of video game world data for recording within the video game world;
executing a sequence of animation for the video game world for subsequent display in a plurality of video game frames, wherein the sequence of animation includes at least one identified component;
recording the video game world data for at least one of the identified plurality of components, wherein at least a portion of the video game world data is generated by the execution of the sequence of animation and recording the video game world data occurs prior to a rendering and display of the plurality of video game frames such that the recorded video game world data is to be rendered in order to generate a displayable video game image, wherein the video game world data associated with each video frame is stored in a flat file format, and wherein the video game world data associated with each video frame includes a distinct data log recording changes of a selected joint over a predetermined game sequence, wherein the video game world data is configured such that the distinct data log of a frame is independent from another frame;
identifying the content for compositing on at least one video game frame;
compositing at least one selected video game frame with the identified content;
replaying and recording new video game world data generated by the execution of at least a portion of the sequence of animation corresponding to the at least one selected video frame composited with the identified content prior to rendering, recording and displaying the plurality of video game frames; and
providing the newly recorded video game world data to a material system prior to a subsequent display of at least the portion of the sequence of animation that corresponds to the at least one selected video game frame composited with the identified content.

8. The device of claim 7;
wherein the video game world data comprises environment data, character data, physics data, game world motion data, sound data, event data, non-sampled parameter data, and timing data from the video game world prior to submission to the material system.

9. The device of claim 7;
wherein compositing further comprises layering another composited video game frame with the identified content with a previously composited video game frame.

10. The device of claim 7, further comprising:
displaying a motion trail in the displayed plurality of video game frames for at least one selected joint of a video game character, wherein the motion trail further displays a change in at least one of a location and an orientation for the at least one selected joint over time.

11. The device of claim 7;
wherein the material system determines a change in shading of at least one object in the video game world based on the recorded video game world data.

12. The device of claim 7;
wherein the material system determines a change in occlusion of at least one object based on the new video game world data.

13. A processor readable non-transitory storage medium that includes data and instructions for compositing content for a video game world with a network device, wherein the execution of the instructions by a processor enables actions, comprising:
identifying a plurality of components of video game world data for recording within the video game world;
executing a sequence of animation for the video game world for subsequent display in a plurality of video game frames, wherein the sequence of animation includes at least one identified component;
recording the video game world data for at least one of the identified plurality of components, wherein at least a portion of the video game world data is generated by the execution of the sequence of animation and recording the video game world data occurs prior to a rendering and display of the plurality of video game frames such that the recorded video game world data is to be rendered in order to generate a displayable video game image, wherein the video game world data associated with each video frame is stored in a flat file format, and wherein the video game world data associated with each video frame includes a distinct data log recording changes of a selected joint over a predetermined game sequence, wherein the video game world data is configured such that the distinct data log of a frame is independent from another frame;
identifying the content for compositing on at least one video game frame;
compositing at least one selected video game frame with the identified content;
replaying and recording new video game world data generated by the execution of at least a portion of the sequence of animation corresponding to the at least one selected video frame composited with the identified content prior to rendering, recording and displaying the plurality of video game frames; and
providing the newly recorded video game world data to a material system prior to a subsequent display of at least the portion of the sequence of animation that corresponds to the at least one selected video game frame composited with the identified content.

14. The medium of claim 13;
wherein the video game world data comprises environment data, character data, physics data, game world motion data, sound data, event data, non-sampled parameter data, and timing data from the video game world prior to submission to the material system.

15. The medium of claim 13:
wherein compositing further comprises layering another composited video game frame with the identified content with a previously composited video game frame.

16. The medium of claim 13, further comprising:
displaying a motion trail in the displayed plurality of video game frames for at least one selected joint of a video game character, wherein the motion trail further displays a change in at least one of a location and an orientation for the at least one selected joint over time.

17. The medium of claim 13:
wherein the material system determines a change in shading of at least one object in the video game world based on the recorded video game world data.

18. The medium of claim 13:
wherein the material system determines a change in occlusion of at least one object based on the new video game world data.

19. A system for compositing content for a video game world, comprising:
   a first network device, including:
      a first memory configured to store data;
      a first display device;
      a first processor that is operative to execute the data stored in the first memory that enables actions to be performed, comprising:
         identifying a plurality of components of video game world data for recording within the video game world;
         executing a sequence of animation for the video game world for subsequent display in a plurality of video game frames, wherein the sequence of animation includes at least one identified component;
         recording the video game world data for at least one of the identified plurality of components, wherein at least a portion of the video game world data is generated by the execution of the sequence of animation and recording the video game world data occurs prior to a rendering and display of the plurality of video game frames such that the recorded video game world data is to be rendered in order to generate a displayable video game image, wherein the video game world data associated with each video frame is stored in a flat file format, and wherein the video game world data associated with each video frame includes a distinct data log recording changes of a selected joint over a predetermined game sequence, wherein the video game world data is configured such that the distinct data log of a frame is independent from another frame;
         identifying the content for compositing on at least one video game frame;
         compositing at least one selected video game frame with the identified content;
         replaying and recording new video game world data generated by the execution of at least a portion of the sequence of animation corresponding to the at least one selected video frame composited with the identified content prior to rendering, recording and displaying the plurality of video game frames; and
         providing the newly recorded video game world data to a material system prior to a subsequent display of at least the portion of the sequence of animation that corresponds to the at least one selected video game frame composited with the identified content; and
   a second network device, including:
      a second memory configured to store data;
      a second display device;
      a second processor that is operative to execute the data stored in the second memory that enables actions to be performed, comprising:
         executing the video game world based at least in part on the newly recorded video game world data; and
         rendering and displaying the portion of the sequence of animation that corresponds to the at least one selected video game frame composited with the identified content within at least a portion of the video game world that is displayed to a user.

20. The system of claim 19;
wherein the video game world data comprises environment data, character data, physics data, game world motion data, sound data, event data, non-sampled parameter data, and timing data from the video game world prior to submission to the material system.

21. The system of claim 19;
wherein compositing further comprises layering another composited video game frame with the identified content with a previously composited video game frame.

22. The system of claim 19, further comprising:
displaying a motion trail in the displayed plurality of video game frames for at least one selected joint of a video game character, wherein the motion trail further displays a change in at least one of a location and an orientation for the at least one selected joint over time.

23. The system of claim 19;
wherein the material system determines a change in shading of at least one object in the video game world based on the recorded video game world data.

24. The system of claim 19;
wherein the material system determines a change in occlusion of at least one object based on the new video game world data.

* * * * *